United States Patent
Menke

(10) Patent No.: US 7,320,495 B2
(45) Date of Patent: Jan. 22, 2008

(54) MOTOR VEHICLE

(75) Inventor: Johannes-Theodor Menke, Velbert (DE)

(73) Assignee: Kiekert AG, Heiligenhaus (DE)

( * ) Notice: Subject to any disclaimer, the term of this patent is extended or adjusted under 35 U.S.C. 154(b) by 108 days.

(21) Appl. No.: 10/555,302

(22) PCT Filed: May 13, 2004

(86) PCT No.: PCT/DE2004/001001

§ 371 (c)(1),
(2), (4) Date: Nov. 2, 2005

(87) PCT Pub. No.: WO2004/103749

PCT Pub. Date: Dec. 2, 2004

(65) Prior Publication Data

US 2007/0063538 A1 Mar. 22, 2007

(30) Foreign Application Priority Data

May 16, 2003 (DE) ............... 103 22 122

(51) Int. Cl.
*B60J 1/08* (2006.01)
(52) U.S. Cl. .................. 296/146.1
(58) Field of Classification Search ............. 296/146.1, 296/146.9, 155, 146.6; 292/216, 201, 336.3, 292/337, 144; 49/360, 280, 502; 70/107
See application file for complete search history.

(56) References Cited

U.S. PATENT DOCUMENTS

| 2,922,672 | A |   | 1/1960  | Van Voorhees          |
|-----------|---|---|---------|-----------------------|
| 4,505,500 | A | * | 3/1985  | Utsumi et al. ........ 292/48 |
| 4,580,823 | A | * | 4/1986  | Yamada et al. ....... 296/155 |
| 4,887,390 | A | * | 12/1989 | Boyko et al. ......... 49/214 |
| 4,915,428 | A | * | 4/1990  | Hayakawa ............ 292/29 |
| 5,525,875 | A | * | 6/1996  | Nakamura et al. .... 49/280 |
| 5,832,669 | A | * | 11/1998 | Mizuki et al. ........ 49/360 |
| 6,206,455 | B1 | * | 3/2001 | Faubert et al. ....... 296/155 |
| 6,286,260 | B1 | * | 9/2001 | Grabowski ........... 49/216 |
| 6,382,705 | B1 | * | 5/2002 | Lang et al. ........... 296/146.12 |
| 6,616,214 | B2 | * | 9/2003 | Wattebled ............. 296/146.1 |
| 7,059,654 | B2 | * | 6/2006 | Ichinose ............... 296/146.1 |

FOREIGN PATENT DOCUMENTS

| DE | 199 42 360 A1 | 4/2001 |
| DE | 199 57 061 A1 | 5/2001 |
| EP | 1 031 690 A1 | 8/2000 |
| JP | 2000-280744 A | 10/2000 |

* cited by examiner

*Primary Examiner*—Kiran B. Patel
(74) *Attorney, Agent, or Firm*—Matthias Scholl P.C.; Matthias Scholl

(57) ABSTRACT

The invention discloses a vehicle with a front door and a rear door without a B column between the two doors, with the front door latch being designed as a power latch with a door-closing assistance and the rear door latch containing a power latch holder with an adjustable locking bolt, in order to achieve a stable door connection with low closing forces.

15 Claims, 5 Drawing Sheets

Prior Art

Prior Art

MOTOR VEHICLE

CROSS-REFERENCE TO RELATED APPLICATIONS

This is a National Stage Application of International Patent Application No. PCT/DE 2004/001001, with an international filing date of May 13, 2004, which is based on German Patent Application No. 103 22 122.0, filed May 16, 2003. The contents of both of these specifications are incorporated herein by reference.

BACKGROUND OF THE INVENTION

1. Field of the Invention

The invention refers to a vehicle with at least one front door and a front door latch and a sliding door or pagoda door as rear door with at least one rear door latch.

2. Description of Related Art

A pagoda door refers, in particular, to a rear door coupled by a pantograph-like hinge arrangement (see DE 196 34 369 C1), which swings open during the opening operation and is retractable mainly parallel to the longitudinal direction of the vehicle (closing operation is in reverse order). The front door is preferably a door arranged on a hinge, whose swiveling axis is mainly arranged vertically to the driving direction of the vehicle.

In vehicles and, in particular in cars, the connection of the vehicle roof to the vehicle body in forward and reverse driving direction is provided on both sides by supports, called A columns (front of roof), B columns (center of roof) and C columns (rear of roof). Vehicles without B columns are thus such vehicles, where the roof of the vehicle is not separately supported in the middle of the vehicle. In this context, vehicles referred to especially as coupes and cabriolets are known, which generally only contain two hinge-mounted front doors. There are, however, also vehicles of this type and limousines without B columns and with panoramic view, which also contain rear doors. In such vehicles, there is the option of equipping the vehicle doors with locking mechanisms attached individually for each vehicle door on the roof pillar and on the floor ledge (entrance ledge) (see EP 1 050 645 A1). In such an embodiment, satisfactory connection of the vehicle doors in the middle of the vehicle, that is where the B column is missing, can only be achieved with considerable design efforts, in particular, as these areas are subjected to considerable (wind) pressure at high vehicle speeds. The connection of the vehicle in the middle of the vehicle also only has a limited stability. When pushing the front door closed or pushing or sliding the rear door closed, considerable spring effects or retrospective spring effects occur, as a result of which, higher forces are required for correctly closing the vehicle doors.

US 2000/002 73 75 A1, on which the invention is based, also discloses a vehicle with at least one front door and a front door latch and a sliding door or pagoda door as rear door with at least one rear door latch, with the front door latch—without a B column between the front door and the rear door—cooperating with the rear door and the rear door latch cooperating with the door frame for the rear door.

Also various embodiments of vehicle door latches are known. In particular, latches containing at least a catch, a pawl, a latch mechanism with a closing assistance for the catch and a locking bolt to be encompassed by the catch on the vehicle body side, are known. The closing assistance serves to move the catch from an intermediate closed position or intermediate position to a fully closed position with the aid of, preferably, an electric motor, in order to make the closing operation as comfortable and reliable as possible (see DE 199 42 360 A1). Vehicle latches, where the door latch is equipped with such a closing assistance, are also referred to as power latches.

Also, vehicle door latches to which a power latch holder with, preferably, a locking bolt, adjustable by an electrical motor, is assigned are known, said motor moving the vehicle door into a final closing position (see DE 199 55 883 A1, DE 199 57 061 A1). The power latch holder is a closing assistance, moving the vehicle door against the resistance of, for instance, a door seal from an intermediate closing position into a final closing position but also serves to prevent any relative movement between the vehicle door and its door frame, producing noise and wear.

In contrast to the above power latch according to DE 199 42 360 A1, a so-called power latch holder latch disclosed in DE 199 55 883 A1 or in DE 199 57 061 A1, only moves the vehicle door from an intermediate closing position to a final closing position once the door latch has engaged into its fully closed position. At this point, it should be pointed out again that the pulling closed of the vehicle door, in case of a vehicle door latch designed as a power latch, is from the intermediate closed position of the catch, whilst the pulling closed of the vehicle door in case of a vehicle door latch designed as a power latch holder is from the fully closed position of the catch. In summary, the vehicle door is moved by the above vehicle door latches into a fully closed position (locking position), which in case of the power latch corresponds to the definition fully closed position and, in case of a power latch holder corresponds to the definition final closing position.

BRIEF DESCRIPTION OF THE DRAWINGS

Below, the invention is explained in detail with reference to a drawing showing only one embodiment, in which.

BRIEF SUMMARY OF THE INVENTION

Figure 1:
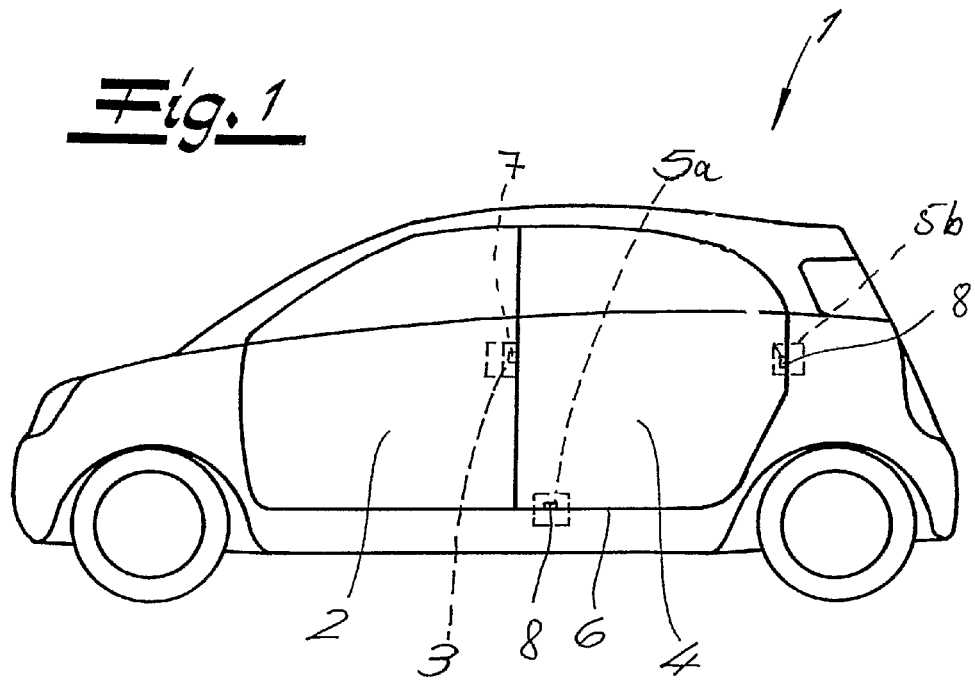
FIG. 1 represents a schematic side view of a vehicle door according to the invention.
Figure 2:
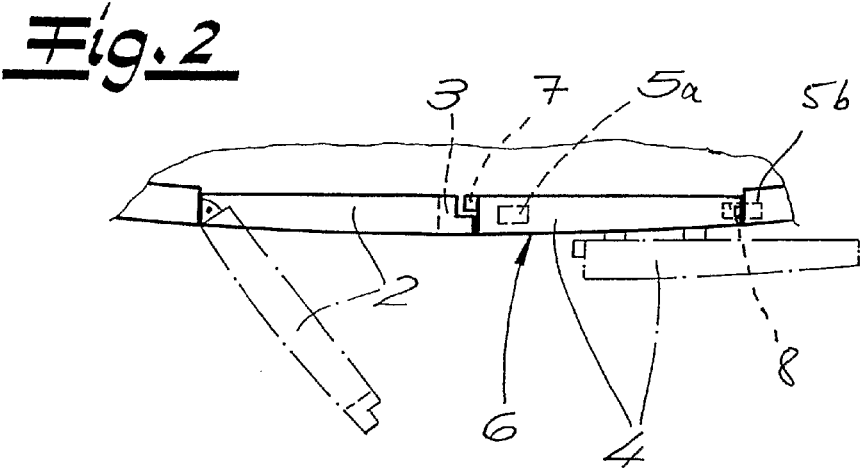
FIG. 2 represents a schematic top view of the object of FIG. 1 onto the door area with an indicated swung open front door and a rear sliding door.

The invention described herein provides a vehicle with at least one front door (2) containing a front door latch (3) and a sliding door or pagoda door as a rear door (4) with at least one rear door latch (5), in which the front door latch (3) cooperates with the rear door (4) in the absence of a B column between the front door (2) and the rear door (4) and the rear door latch (5a, 5b) cooperates with the door frame (6) for the rear door (4), characterized in that the front door latch (3) is designed as a power latch with a door-closing assistance for its catch and that the rear door latch (5a, 5b) contains a power latch holder with an adjustable locking bolt (8) or vice versa.

In certain embodiments of the invention described herein, the rear door (4) contains a rear door latch (5a, 5b) with a power latch holder in the floor-sided door frame area of the C column area.

In certain embodiments of the invention described herein, the front door latch (3) contains a power latch holder and the rear door (4) contains rear door latches (5a, 5b) in the floor-sided door frame area of the C column area, designed as power latches.

In certain embodiments of the invention described herein, a rear door latch (5a, 5b) contains a power latch switch and that a rear door latch is designed as a power latch.

In certain embodiments of the invention described herein, the front door latch (3) and/or the rear door latch (5a, 5b) contains a linearly displaceable power latch holder.

In certain embodiments of the invention described herein, the front door latch (3) and/or the rear door latch (5a, 5b) is equipped with a pivotably displaceable power latch holder.

DETAILED DESCRIPTION OF THE INVENTION

The invention has the task of providing a vehicle of the embodiment described above, without a B column, characterized by a providing in a simple and functional manner, a stable door connection between the front and the rear door as well as a stable connection of the doors to the chassis, whilst producing low locking forces.

In order to solve this task, the invention provides a vehicle of the above type, in which the front door latch cooperates with the rear door without a B column between the front door and rear door and the rear door latch cooperating with the door frame of the rear door and in which the front door latch is designed as a power latch with a closing assistance for a catch and the rear door latch contains a power latch holder with an adjustable locking bolt or vice versa. On the other hand, the front door latch contains a power latch holder and rear door latch is designed as a power latch in the invention. The invention is based on the knowledge that as a result of the combination of a power latch with a door latch with a power latch holder, on one hand, longer closing distances can be achieved in order to move vehicle doors from their intermediate closing position into their final closing position or from their intermediate closed position to their fully closed position and, on the other hand, higher resistance levels can be overcome to achieve a door closing with less noise and wear. This is because the door latch combination of the invention generally provides a more stable door connection between the front door and the rear door and a more stable connection of the doors on the body, whilst requiring lower closing forces.

The advantages provided by the invention can be optimized still further by, in a particularly preferred embodiment, the rear door containing a rear door latch with a power latch holder in the area of the C column and in the floor-sided door frame area, if the front door latch is designed as a power latch. There is, however, also the option that the rear door in the C column area and in the floor-sided door frame area contains a rear door latch designed as a power latch, if the front door latch contains a power latch holder. There is also the option of a combination, i.e. one of the two rear door latches containing a power latch holder and the other rear door latch being designed as a power latch. Assisted closing is provided in all cases. Assisted closing refers to use of known vehicle door latches with, generally, closing by electric motor, moving the vehicle door (or flap) from an intermediate closing position (intermediate closed position) into a final closing position (fully closed position) against the resistance of, for instance, a door seal.

In the preferred embodiment, the rear door must be at least in the intermediate closing position when closing the front door, as the latch holder with the locking bolt or claw bolt for the front door is, according to the preferred embodiment of the invention, part of the rear door. In particular, the preferred position "intermediate closing position" of the rear door prior to closing of the front door, shows the particular advantage of the invention. As the front door, accommodating the power latch, makes contact with the rear door moved into the intermediate closing position prior to it being pulled into its final closing position by the power latch holder. This means that two pulling-closed strokes with each approx. 6 to 8 mm are available. Or, in other words:

The front door is trapped early by the rear door, which as a sliding door is fixed closer to the car body (less torque than front door moved on hinges) and is consequently more stable and is moved into an also stable, guided position. As a result of two closing systems with pulling-closed function, closing forces required for such vehicles can be considerably reduced. At the same time, closing noises can also be significantly reduced. The arrangement of the rear door in the final closing position prior to the closing of the front door thus represents a special embodiment of the invention. All in all, the interlocking connection between the vehicle doors via the rear-door-sided locking bolt/claw bolt also achieves a stable connection in the area without the B column during driving.

According to another embodiment, the power drive of the front door latch can start up once the front door comes in contact (power latch comes in contact with the rear-door locking bolt) with the, preferably still open, rear door of the power drive of the front door latch, moving the catch into the fully closed position. The power drive of the rear door latch (power latch holder) then pulls the rear door and the front door into the closing position.

Alternatively, the power drive of the rear door latches activates upon the front door coming into contact with the rear door, preferably still open (intermediate closed position of the catch of the front door latch) and pulls the rear door into the locking position (final locking position) together with the front door. The power latch of the front door then pulls the latter into is locking position. It is, however, also possible that the power drives are, for instance, operated synchronously.

In all embodiments a, for instance, sensor control indicates when the front door carries out a locking movement (moves towards the vehicle body). The sensor control or similar, operated in this case by the front door, ensures the activation of not only the front door latch but also that of the rear door latches in such a way that the rear door catches the front door, pulls it in and closes it. The door system can preferably contain respective, for instance optical, detection elements (sensors) to ensure, for instance, that the rear door is in any case moved into to preferred intermediate closing position, in order to "catch" the front door prior to the closing of the front door. It is intended that at least the rear door contains an electric motor door drive, such as disclosed, for instance, in DE 198 03 709 C2. The preferably hinged front door can also be driven by an electric motor, such as disclosed, for instance, in DE 104 14 938 A1. In such embodiments, the respective door drives can cooperate with the power latch or the door latches containing the power latch holders, as disclosed in DE 199 44 554 A1 via controls, not described in any more detail at this point, to ensure also in general that an opening of the rear door prior to the opening of the front door is in any case avoided.—In the context of the invention, the front door, moveable in particular via hinges, can also contain devices (sensors) preventing a collision of the vehicle door during opening with objects adjacent to the vehicle (such as another parked car), by directly moving back the vehicle door.

As part of the invention, the room required for the power drive in the power latch is regularly created in the door latch arranged in the respective vehicle door, whilst in case of door latches with power latch holders, the additional room required for the power drive is arranged outside of the actual latch body, i.e. around the latch holder fixing—in the embodiment of the invention on the C column or entrance ledge of the pagoda or sliding door.—The used power latch holders are either types that are mainly linearly displaceable (DE 199 55 883 A1) or types that are rotatably displaceable (DE 199 57 061 A1) with pagoda or sliding doors preferably only using one of these power latch holder types or a combination of both power latch holder types.

The figures show a vehicle 1 with a hinged front door 2 with a front door latch 3 and a sliding door as a rear door 4, containing a rear door latch 5a and/or 5b. The front door latch cooperates with the rear door 4 without a B column between the front door 2 and the rear door 4, whilst the rear door latch 5a cooperates with the door frame 6 for the rear door 4. The latch holder with the locking bolt 7 for the front door latch 3 is then located in or on the rear door 4 and the latch holder with the locking bolt for the rear door latch 5a is in the door frame 6. The front door latch 3 is designed as a power latch with a door-closing assistance for its catch. According to the embodiment, the rear door 4 contains a rear door latch 5a and 5b in the C column area and in the floor-sided door frame area, said latch containing a power latch holder with an adjustable locking bolt. During a closing movement of the front door 2, the rear door 4 picks up the front door 2, pulling it tight with the power latch holder against the force of the door seal, to achieve a stable door connection, whilst only relatively low closing forces are required.

Figure 3:
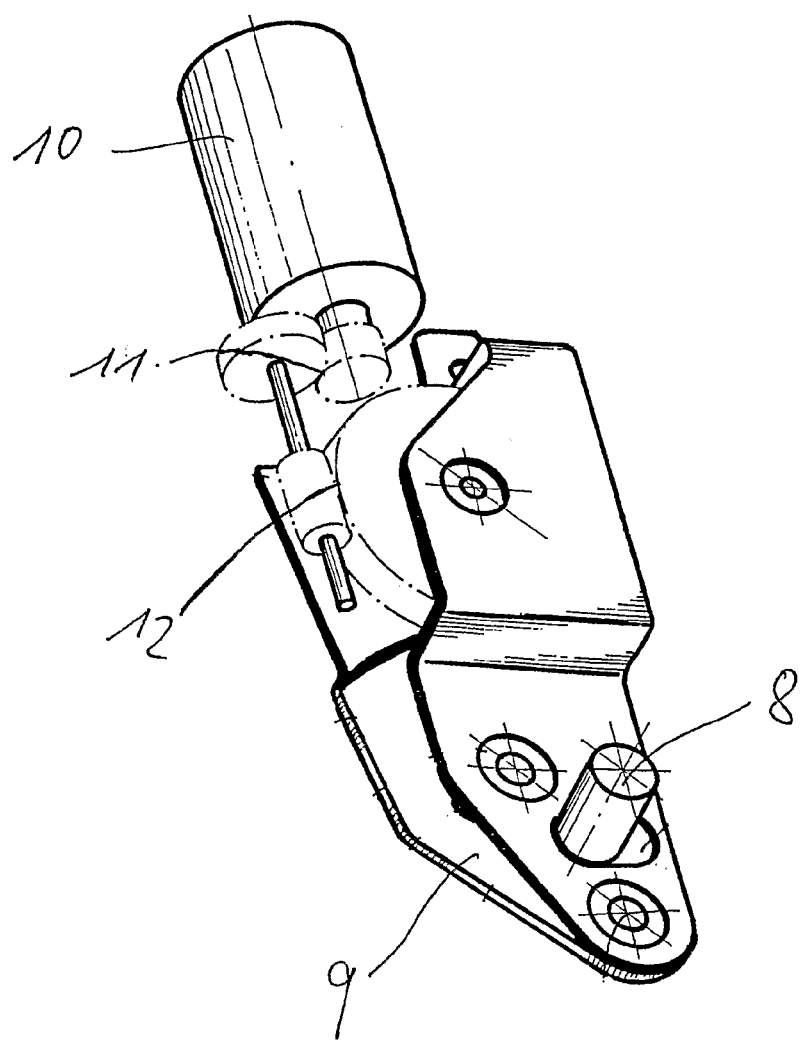
FIG. 3 represents a power latch holder with a predominantly linearly displaceable locking bolt according to prior art disclosed in DE 199 57 061 A1.

FIG. 3 shows a power latch holder known from prior art disclosed in DE 199 55 883 A1, with a predominantly linearly displaceable locking bolt 8. The locking bolt 8 is arranged on a predominantly plate-shaped rocker 9, driven by an electric motor 10 and interposed gears 11, 12 for displacing the locking bolt 8 for moving the vehicle door from the intermediate closing to the final closing position.

Figure 4:
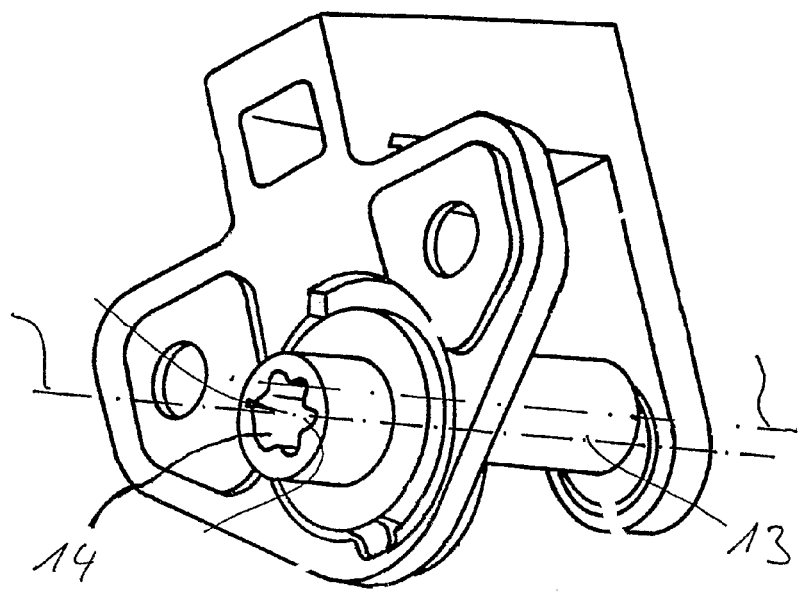
FIG. 4 represents a power latch holder with a predominantly rotatably displaceable locking bolt according to prior art disclosed in DE 199 57 061 A1.
Figure 5:
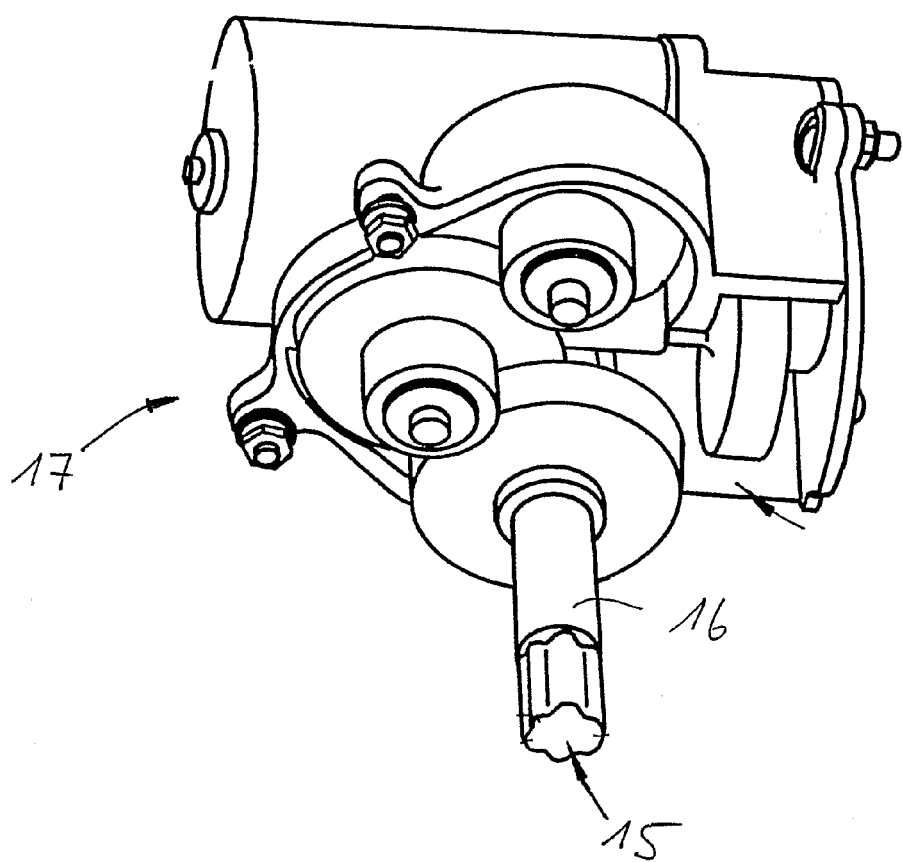
FIG. 5 represents an electric motor drive for a power latch holder with a predominantly rotatably displaceable locking bolt according to prior art disclosed in DE 199 57 061 A1.

FIGS. 4 and 5 show the power latch holder known from prior art disclosed in DE 199 57 061 A1 with a locking bolt 13, predominantly rotatably displaceable by approx. 190°. FIG. 4 shows that the locking bolt 13 contains a journal seat 14 on one end, into which, according to FIG. 5, a journal 15 of a drive shaft 16 of an electric motor drive 17, engages. The locking bolt 13 is eccentrically arranged compared to the drive shaft 16, so that a rotational movement initiated by the drive shaft 16 causes a displacement of the locking bolt, with the consequence that a door latch cooperating with said locking bolt and being in the fully closed position and thus also the vehicle door can be moved into a closing position.

Figure 6:
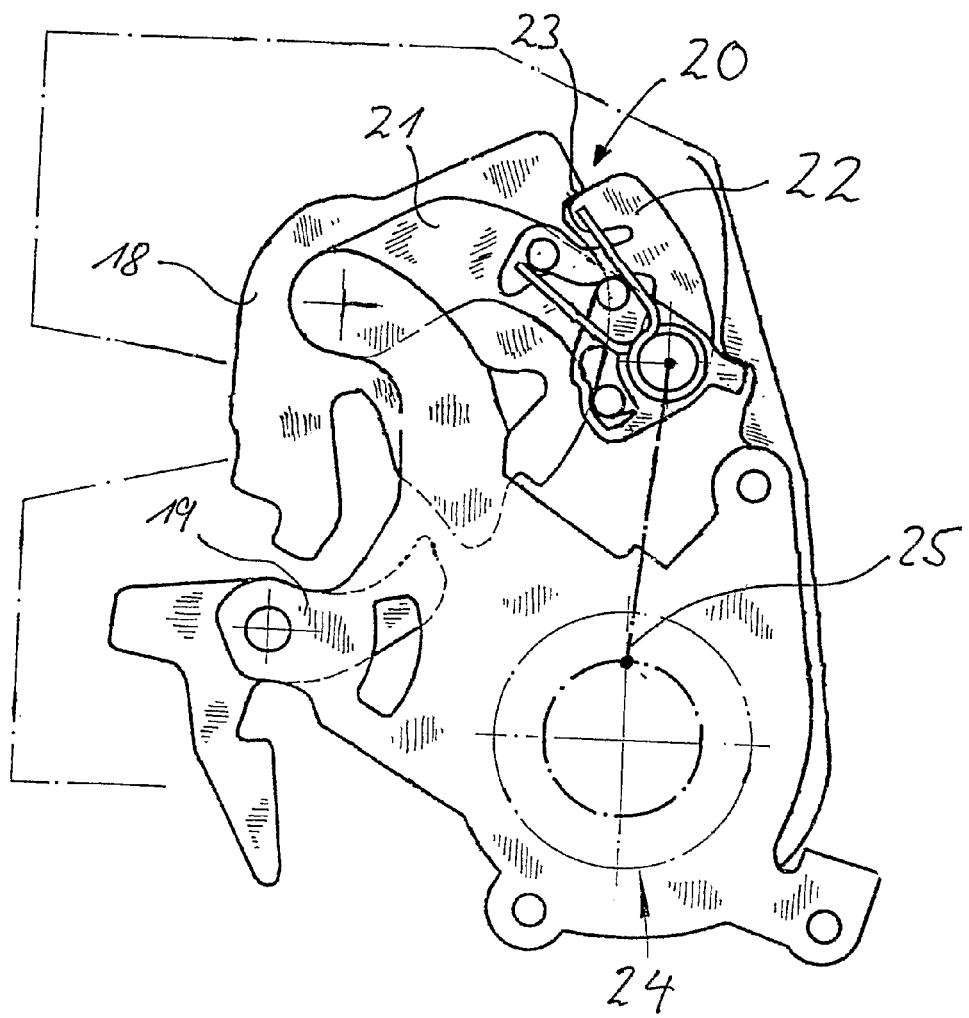
FIG. 6 represents a power latch with a catch drive according to prior art disclosed in DE 199 42 630 A1.

FIG. 6 shows a power latch with a door-closing assistance for a catch according to prior art disclosed in DE 199 42 360 A1, containing a catch 18, a pawl 19 cooperating with the catch 18 and a latch mechanism with an electric motor door-closing assistance 20 for the catch 18. The door-closing assistance 20 contains a pivotably attached rocker 21 with a door-closing pawl 22, pivotably arranged on the rocker 21. The door-closing pawl 22 engages with a working surface 23 at the catch 18 for moving the catch 18 from the intermediate closed position into the fully closed position and moves said catch into the fully closed position with the aid of a crank mechanism 25 whilst the electric motor drive 24 is switched on.

What is claimed is:

1. A door structure for a vehicle comprising:
    at least one front door (2) having at least one power latch (3);
    at least one rear door (4) having at least one rear door latch (5) and at least one first locking bolt (7); and
    at least one rear door frame (6); wherein
    at least one said rear door is a sliding door or a pagoda door;
    said rear door latch (5) comprises a power latch holder having a second locking bolt (8), said second locking bolt (8) being engageable with said rear door frame; and
    said power latch (3) comprises a catch, a pawl, and a door-closing assistance for said catch and said first locking bolt (7), said power latch (3) being engageable with said first locking bolt (7).

2. The door structure of claim 1, wherein said rear door latch (5) is disposed in a C column area.

3. The door structure of claim 1, wherein said rear door latch (5) is disposed in a floor-sided door frame area.

4. The door structure of claim 1, wherein said second locking bolt (8) is linearly displaceable.

5. The door structure of claim 1, wherein said second locking bolt (8) is pivotably displaceable.

6. The door structure of claim 4, wherein said second locking bolt (8) is disposed on a first rocker, said first rocker being driven by an electric motor.

7. The door structure of claim 5, wherein said second locking bold (8) comprises a journal seat, said journal seat being driven by an electric motor.

8. The door structure of claim 1, wherein said door-closing assistance is provided by an electric motor.

9. The door structure of claim 1, wherein said door-closing assistance comprises a second rocker, said pawl being pivotably arranged on said second rocker, and said pawl engaging said catch via a crank mechanism turned by an electric motor.

10. The door structure of claim 1, wherein said rear door comprises further a door seal, and said power latch holder is able to move said rear door against said door seal.

11. The door structure of claim 1, wherein said door-closing assistance is able to move said front door against said rear door.

12. The door structure of claim 1, wherein said front door is disposed on a hinge, said front door being pivotable about an axis, said axis being mostly orthogonal to a direction of motion of the vehicle.

13. The door structure of claim 1 further comprising a roof, wherein said roof is not supported in the middle of the vehicle.

14. The door structure of claim 1, wherein at least one said front door and/or at least one said rear door is movable by an electric motor.

15. The door structure of claim 1 further comprising one or more sensors for determining relative positions of said front door and said rear door with respect to each other.

* * * * *